May 23, 1939.   K. E. ODELL   2,159,042
ELECTRICAL CONNECTION FOR STORAGE BATTERIES
Filed June 8, 1936   3 Sheets-Sheet 1
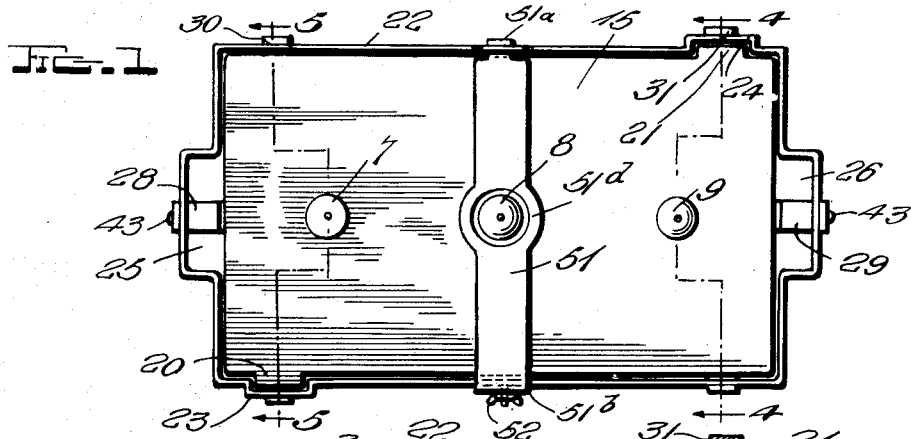
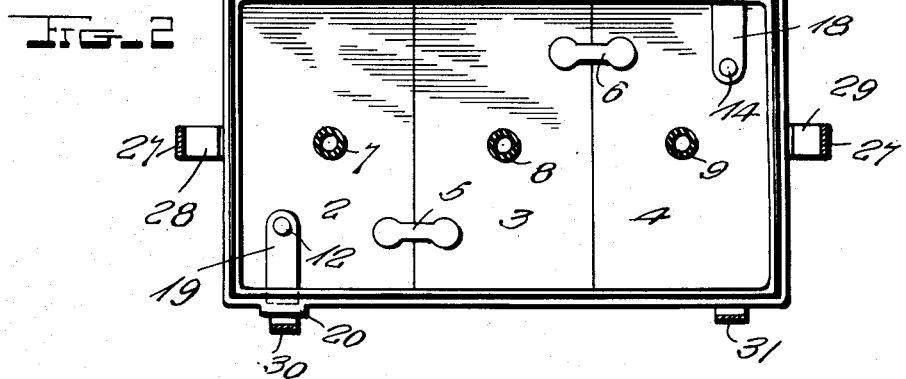
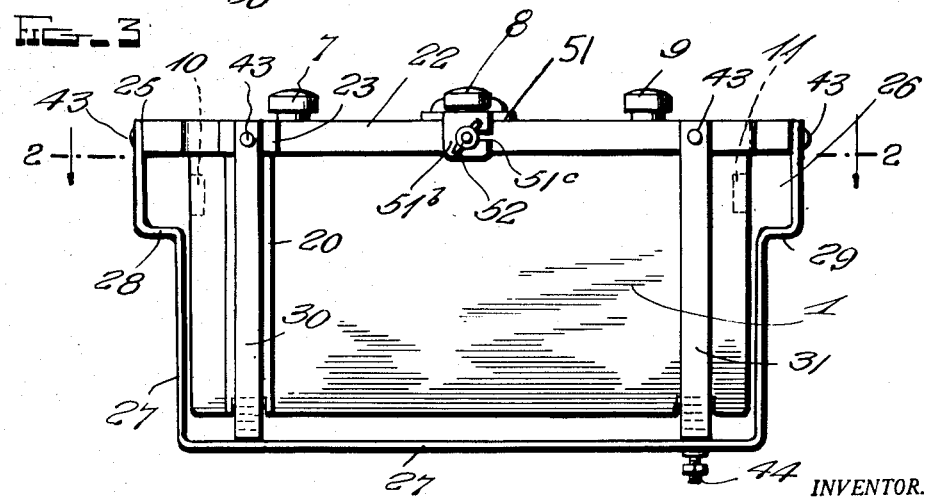
INVENTOR.
Karl E. Odell,
BY John B. Brady
ATTORNEY.

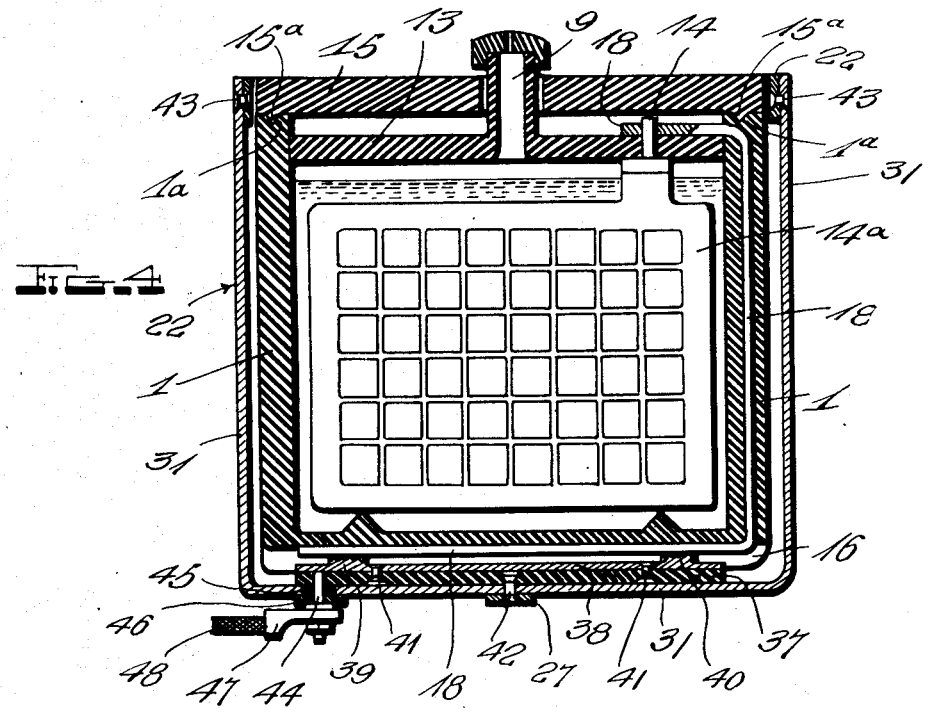
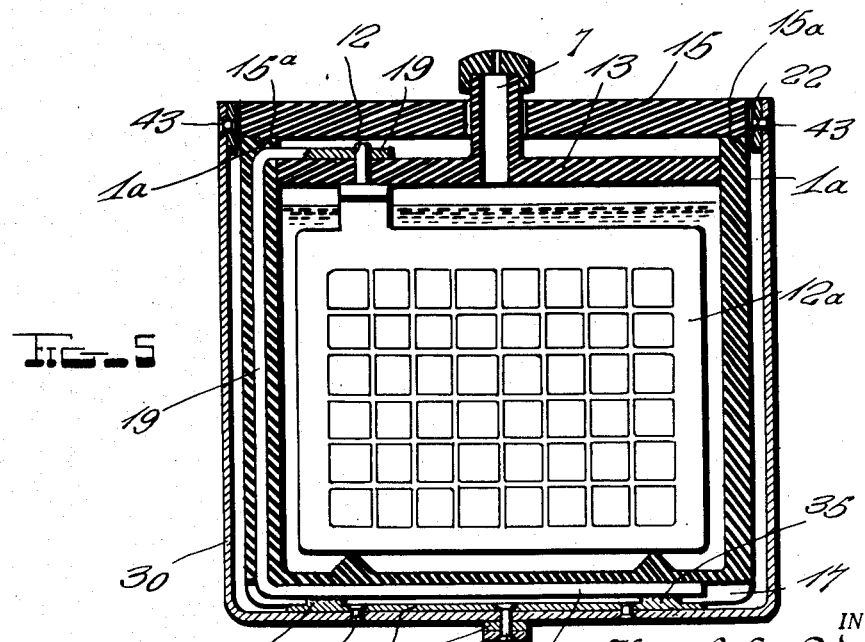

May 23, 1939. K. E. ODELL 2,159,042
ELECTRICAL CONNECTION FOR STORAGE BATTERIES
Filed June 8, 1936 3 Sheets-Sheet 3
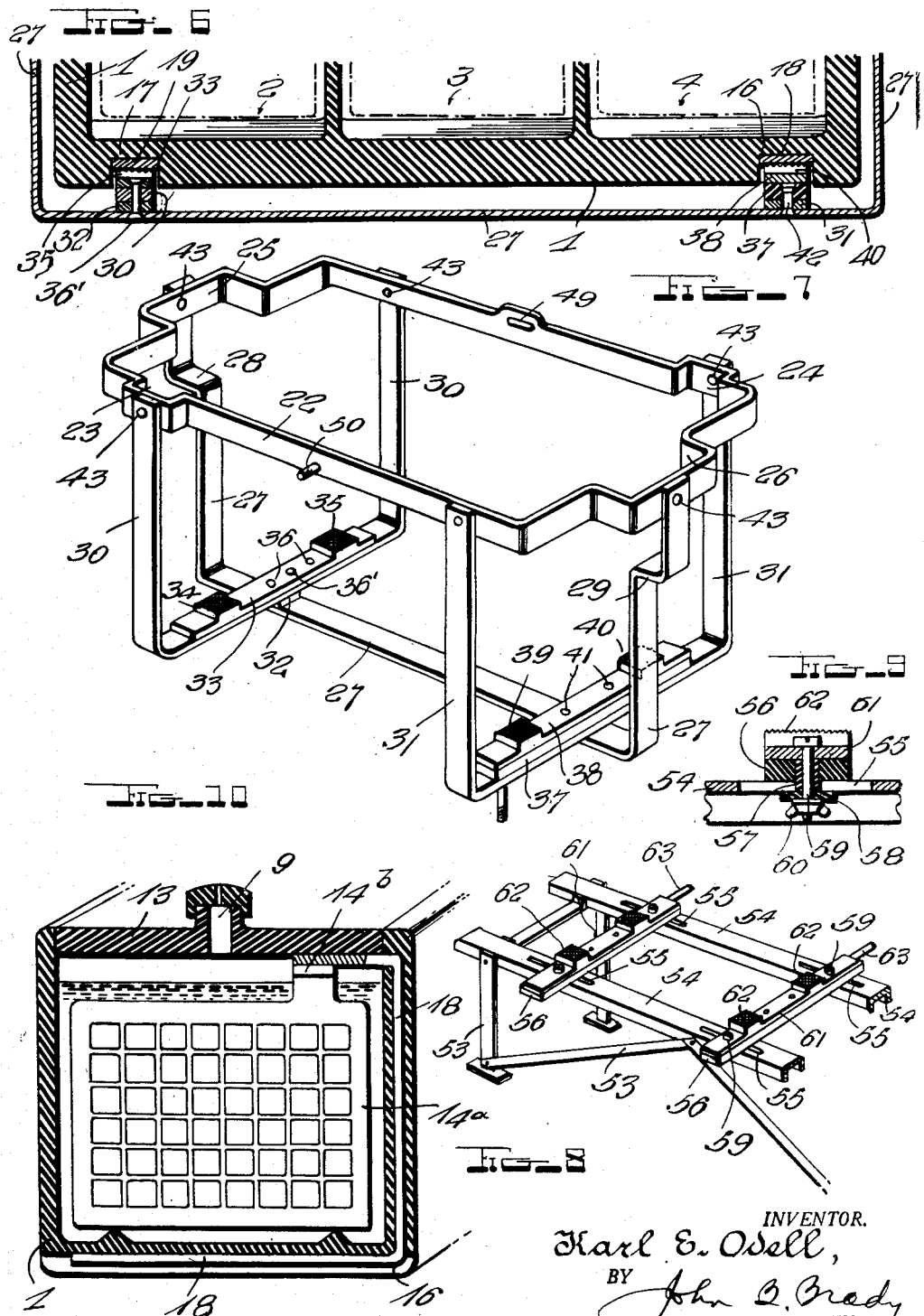
INVENTOR.
Karl E. Odell,
BY John B. Brady
ATTORNEY.

Patented May 23, 1939

2,159,042

UNITED STATES PATENT OFFICE 2,159,042

ELECTRICAL CONNECTION FOR STORAGE BATTERIES

Karl E. Odell, Fremont, Mich., assignor of forty-nine per cent to Henry E. Piltz, Hesperia, Mich.

Application June 8, 1936, Serial No. 84,186

1 Claim. (Cl. 136—171)

My invention relates broadly to storage batteries and more particularly to a system of electrical connection for the terminals of storage batteries.

One of the objects of my invention is to provide a system for establishing electrical connection with the terminals of storage batteries whereby the destructive effects of corrosion are substantially avoided insofar as the electrical connections to the storage battery terminals are concerned.

Another object of my invention is to provide a simplified method of establishing connection with the terminals of a storage battery wherein the mass or weight of the storage battery itself is employed for effecting a substantial and permanent electrical connection between the storage battery and the circuit on the motor vehicle or other circuit with which the storage battery is employed.

Still another object of my invention is to provide a construction of storage battery wherein the terminal connections for the storage battery are effected beneath the battery so that the gravitational force brought about by the mass or weight of the storage battery may be employed for pressing the connections of the storage battery into firm electrical contact with terminal connections carried by the chassis or other stationary structure upon which the storage battery is mounted.

A further object of my invention is to provide a construction of terminal system for storage batteries in which contact members are provided beneath the casing of the storage battery and electrically connected with the terminal posts adjacent the top of the battery with means for establishing connection with the contact surfaces of the contacts beneath the battery under pressure of the weight of the battery when the battery is moved into proper circuit position.

A still further object of my invention is to provide an arrangement of coacting contacts for the terminals of a storage battery where the coacting contacts are arranged beneath the storage battery in alignment with terminal connections provided on the storage battery so that the storage battery may be moved into operative position and at the same time establish electrical connection with the circuit connections with which the storage battery is to be associated.

Still another object of my invention is to provide an arrangement of terminal connection for storage batteries which facilitates the charging of the batteries and avoids the attack of acids with the resulting corrosive effects encountered with the type of storage battery connections heretofore employed.

Other and further objects of my invention reside in a simplified form of electrical connection for storage batteries as set forth more fully in the specification hereinafter following by reference to the accompanying drawings, in which:

Figure 1 is a top plan view of a mounted storage battery with a protective cover in position thereon, the storage battery embodying the electrical terminal connection system of my invention; Fig. 2 is a lateral cross-sectional view of the storage battery and mount taken on line 2—2 of Fig. 3 and showing the cover removed; Fig. 3 is a side elevational view of a mounted storage battery equipped with the electrical terminal connection system of my invention; Fig. 4 is a vertical cross-sectional view taken on substantially line 4—4 of Fig. 1; Fig. 5 is a vertical cross-sectional view taken on substantially line 5—5 of Fig. 1; Fig. 6 is a fragmentary longitudinal sectional view of the lower portion of the storage battery and illustrating the electrical terminal connection for the battery and the aligned coacting connection employed therewith; Fig. 7 is a perspective view of one form of carrier which may be employed in mounting a storage battery adjacent the chassis of an automobile; Fig. 8 illustrates in perspective view a fragmentary portion of a charging bench for storage batteries and illustrating the manner in which the coacting electrodes may be adjusted in position for accommodating the charging bench to batteries of different lengths, that is, batteries of thirteen plate construction or batteries of fifteen plate construction or of various sizes; Fig. 9 is a cross-sectional view showing the manner of mounting the bus bars on the battery charging bench; and Fig. 10 is a lateral cross-sectional view showing a modified construction of the storage battery of my invention.

My invention is directed to a simplified construction of storage battery in which the terminal connections are protected against the effects of corrosion. In storage battery systems generally employed, it has been customary to employ electrical terminals and flexible connectors which have been highly inconvenient to remove and replace on storage batteries working under the limited space conditions available in storage battery installations in automobiles and the like. The system of my invention provides terminal connections on the base of the storage battery, which connections are protected against erasive effects of acid and are electrically connected through the battery case to the storage battery terminal posts adjacent the top of the battery. A protective cover may be employed for entirely sealing the battery across the top. The mass or weight of the battery serves to press the electrical connections on the base of the battery into intimate electrical connection with the circuit terminals which are aligned with the connections carried by the base of the storage battery. Provision is made for insulating the bus bars which provide the circuit terminal connections which coact with the circuit terminal connections of the storage battery. That is, one bus bar may be grounded to the chassis of an automobile, for example, while the other bus bar is insulatingly supported with respect to the chassis of the automobile, providing circuit terminal connections to the storage battery, which connections are completed by merely mounting the storage battery in a suitable frame for contacting the terminals of the battery with the bus bar terminals. By virtue of the weight and mass of the battery, the connections are firmly maintained. I also provide a strap or clamp member which maintains the battery in rigid position in the frame so that the circuit connections of the storage battery may not be shifted with respect to the circuit terminal connections of the automobile or other system with which the storage battery is employed.

In the charging of such storage batteries, the charging bench is in the form of a skeleton frame with laterally extending bus bars thereon which may be adjusted in position to align with the contact terminals on the base of the storage battery. For a thirteen plate battery, for example, the bus bar connections on the charging bench will be closer together than for a battery of fifteen plate construction. The bus bars on the charging bench are insulated from the frame of the bench and connections made to the charging source through end terminals on the bus bars. Once positioned for proper spacial relation, the bus bars may be maintained in fixed position by suitable clamping screws provided for that purpose.

A variety of methods may be employed for establishing connection between the terminal posts and the contact devices on the bottom of the storage battery. Connections run within the side wall of the storage battery to facilitate the connection of the storage battery in the circuit without any exterior conductors which prevents corrosive action upon the connection. That is to say, the electrical connection from a terminal post on the top of the battery to the contact beneath the battery is wholly protected by the insulation material of the battery casing. The actual electrical contact for the battery is removed from the source of corrosive action for such a distance that there is no danger of corrosion beneath the battery. The ordinary connections are made at the top of the battery adjacent the terminal posts but in the system of my invention, the circuit connection between the circuit which is supplied from the storage battery and the contact on the storage battery is made or broken in a position remote from the storage battery posts at the top of the storage battery. Various methods are provided for protecting the contact devices adjacent the base of the storage battery. By mounting the contact devices in laterally extending grooves, the contact devices are prevented from directly contacting with any flat surface. Accordingly, should the storage battery be placed upon the metal top of a table or other conductive object, there is no danger of short-circuiting occurring. Connections can only be made with the contact devices by the proper alignment of circuit terminals with the contact devices recessed into the base of the storage battery. The cradle or frame which supports the storage battery is conveniently shaped to allow the insertion or removal of the storage battery into the frame.

Referring to the drawings in more detail, reference character 1 designates the storage battery casing having a peripheral groove 1a extending around the upper edge thereof to provide a seat for the protective cover hereinafter described. For purposes of illustration, I have shown the battery casing 1 designed to accommodate storage battery cells 2, 3 and 4. The usual connecting means are provided between the several cells as illustrated in Fig. 2 at 5 and 6. The usual vents 7, 8 and 9 are provided for the individual storage battery cells. The casing of the storage battery is provided with indentations or hand grips 10 and 11 at opposite ends of the storage battery casing. The storage battery is provided with the usual terminal posts indicated at 12 and 14 in Fig. 2. The terminal posts 12 and 14 connect with the sets of storage battery plates which I have indicated generally at 12a and 14a respectively. A cover 13 is provided for the cells of the storage battery. For the purpose of protecting the battery, the terminals and the vents, I provide a cover 15 which extends over the entire battery. The cover 15 has a peripheral projection 15a thereon adapted to register with and enter the peripheral groove 1a in the storage battery casing.

Beneath the storage battery, I provide two parallel extending horizontal grooves 16 and 17 which extend the lateral width of the storage battery adjacent opposite ends thereof. These grooves accommodate the contact devices which are provided in the base of the storage battery. I have shown in Fig. 4 the lead connector member 18 extending through the wall of the storage battery 1 and connected to the terminal post 14 at its upper end and extending laterally of the storage battery beneath the storage battery in the groove 16 at the other end. The connector 18 thus provides a connection to the terminal post 14, and the contacting surface at the base of the storage battery. The contacting surface provided by the connecting member 18 adjacent the base of the battery is recessed within the base of the battery by virtue of the groove 16. That is to say, the material of the base of the battery on either side of groove 16 projects below the contacting surface of the connecting member 18 and thereby protects the connecting member 18 against contact with any flat surface upon which the casing 1 of the battery may rest.

In a similar way, I provide a connecting member extending from terminal post 12 as shown at 19 in Fig. 5 where the connecting member extends to a position beneath the storage battery in groove 17. The connecting member 19 is formed into the wall of the storage battery casing 1 and is protected against corrosive effects which might arise by attack from acid from the battery. The connecting members 18 and 19 are substantially in the form of straps which extend around the battery from the terminal post adjacent the top of the battery to a position beneath the battery. In order to accommodate the connecting members 18 and 19, the side wall of the casing of the battery 1 is offset or enlarged to wholly enclose the connecting members 18 and 19 as indicated for example at 20 and 21 in Fig. 2. The protective cover 15 is similarly projected to wholly cover the enlargement at the side of the battery brought about by the protection of the leaded connections 18 and 19 in the side wall of the battery. It is not essential that the battery casing be projected as I have shown as it is entirely possible to extend the connector within the side wall of the casing without enlarging the wall.

While I have mentioned the use of the storage battery in automobiles, it will be understood that the storage battery of my invention is adapted for all uses and the reference to the use of the said battery in automobiles is merely for illustrative purposes. When so used, the storage battery may be mounted in a variety of hangers or carriers. I have illustrated in Fig. 7 one form of carrier which may be employed. I have shown the carrier constructed from openwork metal strip where there is a peripheral frame 22 constituting the top of the carrier which is offset at required positions about the periphery of the battery as indicated at 23, 24, 25 and 26. The offset 23 accommodates the enlarged portion of the storage battery casing indicated at 20. The offset at 24 accommodates the offset portion of the storage battery casing shown at 21. The offsets 25 and 26 at opposite ends of the frame enable the hand to be moved to a position along the sides of the storage battery casing to permit a hand grip to be obtained in the recesses 10 and 11 in the end walls of the storage battery.

The carrier includes a longitudinally extending central frame member 27 which is secured to the offset ends 25 and 26 of the carrier member 22. Each of the vertical portions of the longitudinally extending frame member 27 is provided with an offset bend shown at 28 and 29 just below the position at which the hand grips 10 and 11 in the end walls of the storage battery terminate, as shown more particularly in Fig. 3.

The carrier includes a pair of laterally arranged U shaped frame members 30 and 31 which are riveted by means of suitable rivets 43 with the horizontally extending peripheral frame member 22 and which are secured through rivet connections with the central longitudinally extending frame member 27 as will be hereinafter described in more detail.

The laterally extending frame members 30 and 31 provide carriers for the coacting contact devices which align with the connection members 18 and 19 recessed in the base of the storage battery. One of the coacting contact members is grounded to the frame of the carrier and to the chassis of the automobile or other structure with which the storage battery may be employed. However, the other coacting contact device must be insulated from the carrier. To provide for the mounting of the coacting contact which is grounded to the frame of the carrier, I first provide a spacing block 32 immediately between the longitudinally extending frame member 27 and the laterally extending frame member 30. This arrangement is shown more particularly in Fig. 5. A bus bar or coacting device 33 is riveted by means of rivets 36 to the laterally extending frame member 30. In this particular instance, it is possible to provide a rivet 36' which extends through the bus bar 33, the frame member 30, and spacing bar 32 and frame member 27, as indicated in Fig. 5. The bus bar 33 carries a pair of conductive surfaces 34 and 35. These conductive surfaces 34 and 35 are serrated or grooved to provide biting faces which extend into the material of the connection member 19. The conductive surfaces 34 and 35 extend upwardly into the groove 17 and engage the contacting surface of the connection member 19 establishing good electrical connection therewith.

The opposite connection for the storage battery and circuit must be insulated from the frame which carries the storage battery. Accordingly, I provide a strip of heavy insulation shown at 37 in Fig. 4 which separates the bus bar indicated at 38 from the frame member 31. The bus bar 38 is provided with upwardly projecting conductive surfaces 39 and 40 which provide serrated faces for the purpose of engaging the connecting member 18 and establishing firm electrical connection therewith. The bus bar 38 is secured to the heavy strip of insulation 37 by means of rivets 41. These rivets cannot extend through or make contact with the frame member 31 as was the case with respect to the other contact device where rivets 36 extended into the frame member 30. The insulation member 37 is held in position, and the longitudinally extending frame member 27 is secured to the laterally extending frame member 31 through rivet 42 as illustrated in Fig. 4. The bus bar 38 carries a terminal post 44 which depends downwardly therefrom through a sleeve 45 formed from insulating material which prevents the terminal post 44 from contacting with the frame member 31. To further insure the insulation of terminal 44 from the frame 31, I provide an insulated gasket 46 which prevents the lug 47 secured to terminal 44 from contacting with frame 31. A suitable flexible connection 48 is connected in lug 47 and extends to the circuit which is to be supplied from the storage battery.

It will be observed that the storage battery may be bodily inserted in or removed from the frame. The weight or mass of the storage battery insures the intimate contact relation between the contacting surfaces of the connecting members 18 and 19 with the upwardly projecting conductive surfaces 34 and 35 in the one instance and 39 and 40 in the other instance.

In order to insure that there will be no mechanical displacement of the battery, with respect to the carrier, I provide a laterally extending strap member 51 which is adapted to be placed in position when the battery is disposed in the carrier to prevent dislodgement of the battery. The peripheral frame 22 is enlarged midway of one side thereof and provided with a longitudinally extending slot indicated at 49. The opposite side of the frame member 22 is provided with a pin 50. A metallic strap member 51 shown more particularly in Fig. 1 carries a reduced end section thereof indicated at 51a projected through the slot 49 and the other end thereof shown at 51b is bent downwardly and provided with a laterally extending slot 51c which is adapted to be engaged over the pin 50 and secured in position with respect thereto by means of wing nut 52. The strap member 51 is readily removable by a slight sidewise movement so that the battery can be readily removed from the carrier. The strap member 51 may be readily placed in position by the quick insertion of the end 51a in slot 49 and the quick attachment of the opposite slotted end under the screw member 50. The pressure applied to the top of the battery is uniformly distributed over the entire top of the battery casing so that there is no danger of undue strain and resulting injury to the battery. The strap member 51 is illustrated as provided with a central aperture 51d therein in order to allow filling of the storage battery vent 8 with distilled water from time to time without removal of the strap member from the carrier frame.

There are instances where it is undesirable to have the added expense of the supplemental protective cover 15. In such instances, I may employ the construction illustrated in Fig. 10 where the top of the storage battery shown at 18 is placed directly over the connection 18 in the wall of the storage battery. The connection 18 may have the end thereof lead directly to the connector 14b of the set of storage battery plates 14a without the necessity of bringing the connection through the top of the cover 13. This further insures the prevention of corrosive action by removing the actual place of electrical connection to the connector 18 at a point beneath the storage battery and remote from the top of the battery.

In the electrical charging of the storage battery of my design, the problem is encountered with respect to various sizes of storage batteries, that is, fifteen plate batteries and thirteen plate batteries with the difference in spacial relation of the connection members which serve as the terminals for the storage battery. As illustrated in Figs. 8 and 9, I provide a special form of charging bench having a skeleton frame structure shown at 53 with a pair of horizontally extending rails 54 which support the storage batteries for charging position. The top rails 54 are provided with longitudinally extending slots 55 disposed at suitably spaced positions. Laterally of the slotted portions of the bars 54, I provide insulation bars 56 on which there are supported the bus bar members shown at 61. The bus bars 61 each have upwardly projecting conductive surfaces 62 serrated to engage the connection members 18 and 19 in the recesses in the bottom of the storage battery. To insure the insulation of the bus bars 61 from the frame of the charging bench, I provide sleeve members 57 of insulation material projecting downwardly from the insulation block 56. To further insure the insulation of the bus bars 61 of the frame of the charging bench, I provide insulated gaskets 58 around the lower portion of sleeves 57 and around the depending ends of the bolts 59. The bolts 59 extend through the bus bars 61, the insulated sleeve member 57, the gaskets 58, and are secured beneath the top rail 54 by means of wing nut 60. Because of the length of the slots 55, the bus bars may be shifted toward or away from each other on the rails 54 for properly aligning the projecting contact members 62 with the connection members 18 and 19 in the bottom of the storage battery. Electrical connection is made from the charging source to the bus bars 61 through connectors 63 on the ends of the bus bars 61. The charging bench is thus wholly independent of the electrical circuit and because of its skeleton construction is subject to minimum destruction with respect to the attack of corrosive acids.

My invention has wide application and is particularly adapted for the mounting of storage batteries in aircraft where it is desirable to be able to renew the battery very quickly and yet insure a firm electrical connection between the circuit terminals and the terminals of the storage battery while avoiding action resulting from corrosion due to seepage of acids. The fact that the connection members 18 and 19 are recessed into the bottom of the battery insure that there will be no accidental shortcircuiting of the battery should the battery be rested against a metal surface such as a metal table top. As heretofore noted, various forms of carriers may be employed and in describing the carrier herein, I have not intended to limit my invention to the particular form of carrier shown. Moreover, various forms of contacting arrangements may be employed in the base of the battery and it is not my intention that my invention shall be limited to the particular form shown. It is important, however, that use be made of the mass or weight of the battery in securing and establishing firm electrical connection. The serrated faces of the coacting contact devices enter the material of the connection members 18 and 19 under the normal weight of the battery to insure firm electrical connection but in the event that any dislodgement or displacement might occur, that is prevented by virture of the rigidity of the laterally extending strap 51 provided over the top of the battery.

I have described my invention in certain preferred embodiments but it is not my intention that my invention be limited to the forms shown. I realize that modifications may be made and it is not my intention to limit my invention in any manner other than may be imposed by the scope of the appended claim.

What I claim as new and desire to secure by Letters Patent of the United States is as follows:

Electrical connections for storage batteries, comprising in combination, a storage battery having a casing of insulation material, external laterally extending recesses in the bottom of said casing, connecting posts on said storage battery, a connecting member extending from each of said posts and into one of the recesses beneath said battery for presenting a flat contacting surface beneath said battery displaced from the plane of the bottom of said battery, bus bars aligned with the recesses beneath said battery and having spaced pairs of serrated contacting portions projecting upwardly and into said recesses and engaging the flat contacting surfaces of said connecting members, the contacting portions of said bus bars and said connecting members being pressed into intimate connection by virtue of the weight of said storage battery, and means for adjusting the spacial relation of said bus bars for aligning said bus bars with the connecting members in said recesses.

KARL E. ODELL.